(12) United States Patent
Dore et al.

(10) Patent No.: US 9,955,504 B2
(45) Date of Patent: Apr. 24, 2018

(54) MULTIPLE ACCESS METHOD AND SYSTEM WITH FREQUENCY MULTIPLEXING OF REQUESTS FOR AUTHORISATION TO SEND DATA

(71) Applicant: COMMISSARIAT A L'ENERGIE ATOMIQUE ET AUX ENE ALT, Paris (FR)

(72) Inventors: Jean-Baptiste Dore, Saint Martin le Vinoux (FR); Baher Mawlawi, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 544 days.

(21) Appl. No.: 14/318,838

(22) Filed: Jun. 30, 2014

(65) Prior Publication Data
US 2015/0009906 A1    Jan. 8, 2015

(30) Foreign Application Priority Data
Jul. 3, 2013  (FR) ...................................... 13 56518

(51) Int. Cl.
*H04W 72/04* (2009.01)
*H04W 74/08* (2009.01)
(Continued)

(52) U.S. Cl.
CPC ....... *H04W 74/0816* (2013.01); *H04L 5/0007* (2013.01); *H04L 5/0053* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

| 2003/0093798 A1* | 5/2003 | Rogerson | ............... H04L 12/28 725/75 |
| 2006/0114851 A1* | 6/2006 | Gupta | .................... H04L 47/14 370/329 |

(Continued)

OTHER PUBLICATIONS

Extended European Search Report dated Oct. 31, 2014 in Patent Application No. 14175311.1 (with English Translation).

(Continued)

*Primary Examiner* — Hassan Phillips
*Assistant Examiner* — Prenell Jones
(74) *Attorney, Agent, or Firm* — Oblon, McClelland, Maier & Neustadt, L.L.P.

(57) ABSTRACT

A method for multiple access to a frequency band of a communication channel of a communication network with carrier sense and collision avoidance, the said frequency band being divided into a set of sub-bands includes, at a source node, detecting the availability of the communication channel and transmitting to a destination node a request message for authorization to send data on the communication channel sent over one or more sub-bands, and, at the destination node, detecting simultaneous request messages for authorization to send data on the communication channel transmitted by a plurality of source nodes over a plurality of sub-bands. A message is transmitted authorizing the sending of data on the communication channel by at least one source node among the said plurality of source nodes.

16 Claims, 5 Drawing Sheets

(51) Int. Cl.

| | |
|---|---|
| *H04L 5/00* | (2006.01) |
| *H04L 12/413* | (2006.01) |
| *H04L 27/26* | (2006.01) |
| *H04L 12/40* | (2006.01) |

(52) U.S. Cl.
CPC ...... *H04L 12/40143* (2013.01); *H04L 12/413* (2013.01); *H04L 27/2601* (2013.01)

(56) References Cited

U.S. PATENT DOCUMENTS

| | | | | |
|---|---|---|---|---|
| 2007/0047570 | A1* | 3/2007 | Benveniste | H04L 47/10 370/448 |
| 2007/0081485 | A1* | 4/2007 | Li | H04L 5/0094 370/328 |
| 2008/0273606 | A1 | 11/2008 | Orfanos et al. | |
| 2008/0291858 | A1* | 11/2008 | Kandala | H04W 24/00 370/311 |
| 2009/0086706 | A1 | 4/2009 | Huang et al. | |
| 2009/0196273 | A1 | 8/2009 | Kwon et al. | |
| 2011/0002371 | A1* | 1/2011 | Forenza | H04B 7/0417 375/227 |
| 2011/0317633 | A1 | 12/2011 | Tan et al. | |
| 2012/0082040 | A1* | 4/2012 | Gong | H04W 74/0816 370/252 |
| 2012/0163257 | A1 | 6/2012 | Kim et al. | |
| 2012/0207074 | A1* | 8/2012 | Kneckt | H04W 74/0816 370/312 |
| 2013/0070605 | A1* | 3/2013 | Ghosh | H04W 72/082 370/241 |
| 2013/0225221 | A1* | 8/2013 | Nentwig | H04W 74/085 455/510 |
| 2013/0281022 | A1* | 10/2013 | Mahany | H04W 48/08 455/41.2 |
| 2014/0125423 | A1 | 5/2014 | Pebay-Peyroula et al. | |
| 2014/0126623 | A1 | 5/2014 | Dore et al. | |
| 2014/0204827 | A1* | 7/2014 | Grandhi | H04W 74/0816 370/312 |

OTHER PUBLICATIONS

U.S. Appl. No. 14/533,480, filed Nov. 5, 2014, Mawlawi, et al.
U.S. Appl. No. 14/790,708, filed Jul. 2, 2015, Dore.
French Preliminary Search Report dated Jan. 30, 2014 in French Application 13 56518, filed on Jul. 3, 2013 ( with English Translation of categories of Cited Documents).
Georgios Orfanos et al. "MC-CDMA Based IEEE 802.11 Wireless LAN", Modeling, Analysis, and Simulation of Computer and Telecommunications Systems, 2004, 6 pages.
Jo Woon Chong et al. "RawPEACH: Multiband CSMA/CA-Based Cognitive Radio Networks", Journal of Communications and Networks, vol. 11, No. 2, 2009, 12 pages.
U.S. Appl. No. 14/771,394, filed Aug. 28, 2015, Dore, et al.
U.S. Appl. No. 14/067,137, filed Oct. 30, 2013, 2014-0126623, Dore, et al.
U.S. Appl. No. 14/067,222, filed Oct. 30, 2013, 2014-0125423, Pebay-Peyroula, et al.
Giuseppe Bianchi, "IEEE 802.11—Saturation Throughput Analysis" IEEE Communications Letters, vol. 2, No. 12, Dec. 1998, pp. 318-320.
French Preliminary Search Report dated Aug. 21, 2014, in Patent Application No. FR 1360874 (FA791428) (with English translation).
Haile Gebreselassie, et al., "C-OFDMA: Improved Throughput for Next Generation WLAN Systems Based on OFDMA and CSMA/CA", 4th International Conference on Intelligent Systems, Modelling and Simulation, (IEEE Computer Society), XP032364326, Jan. 29, 2013, pp. 497-502.
Junwoo Jung, et al., "Group Contention-Based OFDMA MAC Protocol for Multiple Access Interference-Free in WLAN Systems", IEEE Transactions on Wireless Communications, vol. 11, No. 2, XP011414999, Feb. 1, 2012, pp. 648-658.
H. M. Alnuweiri, et al., "OFDMA-Based Medium Access Control for Next-Generation WLANs", Eurasip Journal on Wireless Communications and Networking, vol. 2009, Article ID 512865, 2009, 9 pages.

* cited by examiner

MULTIPLE ACCESS METHOD AND SYSTEM WITH FREQUENCY MULTIPLEXING OF REQUESTS FOR AUTHORISATION TO SEND DATA

TECHNICAL FIELD

The field of the invention is multiple access to a frequency band of a communication network with carrier sense and collision avoidance.

STATE OF THE PRIOR ART

Carrier Sense Multiple Access/Collision Avoidance (CSMA/CA) is a multiple access protocol which can be used in wireless communication systems to manage the allocation of wireless resources.

This protocol is used to avoid collisions between multiple users (source nodes) wishing to access a common access point (destination node) at the same time on the uplink.

According to this protocol, a source node wishing to transmit data listens to the communication channel. If the channel is busy, a time (expressed in number of time slots) of a backoff counter is randomly chosen within an interval [0, CW−1], where CW is the contention window. The backoff counter is decremented by 1 each time the channel is detected as being available for a time DIFS (<<Distributed Inter-Frame Space>>). The backoff counter is stopped when the channel is busy and resumes when the channel is again available at least for the DIFS time.

When the backoff counter reaches zero, the source node transmits a message requesting authorisation to send data (RTS <<Request To Send>>) to the destination node and waits to receive an authorisation message authorising the sending of data (CTS—<<Clear To Send>>) from the destination node before transmitting data. On receipt of all the transmitted data and immediately after expiry of a time SIFS (<<Short Inter-Frame Space>>), the destination node sends an acknowledgement message ACK (for <<ACKnowledgment>>).

The contention window CW is an integer within an interval [$CW_{min}$, $CW_{max}$]. This window CW is initially set at the minimum value $CW_{min}$. Each time a source node is involved in a collision, it increases its wait time by doubling the CW window up to the maximum value $CW_{max}$. On the contrary, in the event of success of transmission the source node reduces the window CW to its minimum value $CW_{min}$.

A CSMA/CA system in conventional single-channel operation has the advantage of requiring neither signalling for bandwidth request nor allocation in accordance with planned access. On the other hand, its efficacy is fairly low insofar as its performance level is rapidly degraded when the number of source nodes increases. This limitation can be overcome by having recourse to multiple access by distribution over different sub-bands according to which several source nodes can simultaneously transmit on different sub-bands, the source nodes having knowledge of the availability status of each of the sub-bands at any time. This multiple access by distribution over different sub-bands uses the OFDMA access method for example (Orthogonal Frequency Division Multiple Access) whereby the spectral resource (bandwidth) is divided into a set of orthogonal sub-carriers. This set of sub-carriers is itself divided into sub-sets, each sub-set of sub-carriers forming a sub-band forming a communication channel. The source nodes therefore compete with one another to access the resource both in time and in frequency.

A CSMA/CA system operating in multichannel mode is known for example from the article by J. W. Chong, Y. Sung and D. K. Sung, titled "RawPEACH: Multiband CSMA/CA-Based Cognitive Radio Networks", Communications and Networks, Journal of, vol. 11, no. 2, pp. 175-186, 2009. According to this system the allocated bandwidth B is divided into $N_{CH}$ sub-bands, and each sub-band is divided into time slots of duration $T_s$, the boundaries between the time slots being synchronised between the sub-bands. This system is intended more particularly to ensure a certain level of service quality for some high priority users (qualified as primary users). A channel is therefore reserved for each primary user whereby they are given a competition-free channel orthogonal to the other channels consisting of a sequence of sub-bands on which they can transmit data. With reference to FIG. 2 of this document, three competition-free channels A, B and C are defined. Channel A hops between the sub-bands B1, B3 and B1, but the user to whom this channel is assigned only transmits from t to t+$T_{fp}$, which means that channel A is freed at $T_{fp}$. Channel C hops between the sub-bands B3, B1 and B2, and the user to whom this channel is assigned transmits on each of the three illustrated intervals.

If the number of primary users is higher than a number $N_{CH}$ of sub-bands, the orthogonality between the primary users cannot be maintained. Therefore the number of users cannot exceed the number $N_{CH}$ of sub-bands. As a result this system requires admission control to refuse a request from a user wishing to be treated as a primary user when all the primary channels are used. The user thus given refusal can then initiate a session as secondary user of lesser priority.

Under conditions of low or medium traffic, it is probable that the resources are not all entirely used by primary users. These resources in time and/or frequency can then be used to serve secondary users. The authors of this article propose implementing the conventional single-channel CSMA/CA protocol for secondary users by simply adapting this protocol so that the backoff counters of the secondary users are paused when all the sub-bands are used on account of transmission by primary users. If at least one of the sub-bands is detected as being non-occupied by a primary user, the secondary users each decrement their backoff counter by 1. When a backoff counter reaches zero, the associated secondary user starts to transmit data on a sub-band randomly selected among the at least one sub-band non-occupied by a primary user. If more than one secondary user simultaneously transmits data on the same sub-band a collision occurs.

Another example of CSMA/CA system with multiband functioning is given by publication US 2009/0196273 A1 which provides another method for managing the backoff counter. In this publication if one of the sub-bands is detected as being available over a time corresponding to a waiting slot, a source node decrements its backoff counter by a value corresponding to the number of available sub-bands. When the backoff counter of a source node reaches zero, the source node randomly selects one of the available sub-bands and transmits its data. The boundaries of the waiting slots are synchronized between the different sub-bands and a source node is only authorised to start waiting or to transmit at the start of each slot.

DESCRIPTION OF THE INVENTION

It is the objective of the invention to provide a technique allowing an improvement in the transmission capacities of a CSMA/CA system, and for this purpose proposes a method for multiple access to a frequency band of a communication channel of a communication network with carrier sense and collision avoidance, the said frequency band being divided into a set of sub-bands of the communication channel, the method comprising at a source node:

detection of the availability of the communication channel;
  subsequent to detection of the availability of the communication channel, modification of a value of a backoff counter; and
  when the value of the backoff counter reaches a predetermined value, transmission to a destination node of a message requesting authorisation to send data on the communication channel, the said transmission being performed on one or more sub-bands (SBi, SB1, SB0) forming a sub-set of said set of sub-bands of the communication channel.

The invention also concerns a method for multiple access to a frequency band of a communication channel of a communication network with carrier sense and collision avoidance, the said frequency band being divided into a set of sub-bands of the communication channel, comprising at a destination node:

the detection of simultaneous messages requesting authorisation to send data on the communication channel, transmitted by a plurality of source nodes on a plurality of sub-bands;
  the transmission of a message authorising the sending of data on the communication channel by at least one source node among the said plurality of source nodes.

The invention also extends to a destination node and to a source node configured to implement these methods, and to a communication network comprising said nodes. Finally, it extends to a computer program product comprising code instructions to perform the steps of these methods when the said program is run on a computer.

BRIEF DESCRIPTION OF THE DRAWINGS

Other aspects, objectives, advantages and characteristics of the invention will become better apparent on reading the following detailed description of preferred embodiments thereof, given as non-limiting examples, with reference to the appended drawings in which.

DETAILED DESCRIPTION OF PARTICULAR EMBODIMENTS

According to a first aspect the invention pertains to a method for multiple-access to a frequency band of a communication channel of a communication network, e.g. a wireless network, with carrier sense and collision avoidance.

Figure 1:
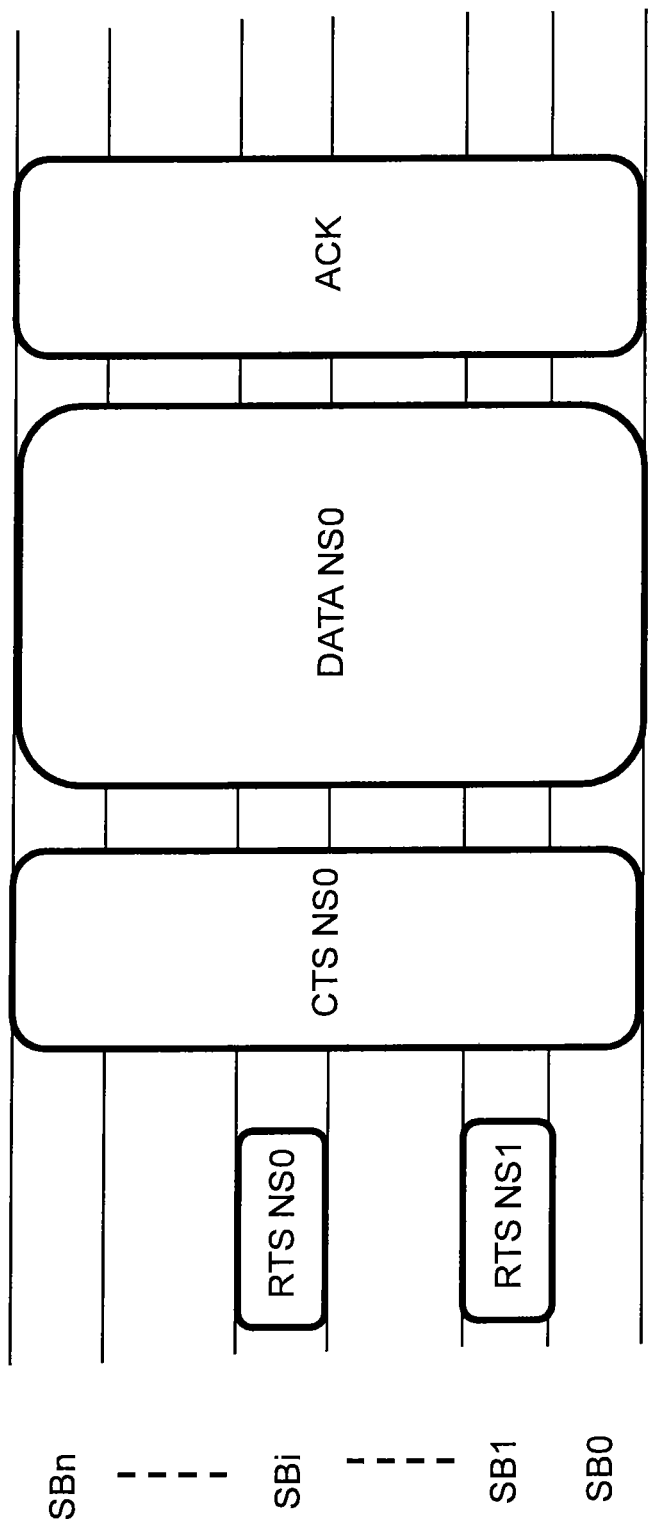
FIG. 1 is a schematic illustrating the data transiting on the different sub-bands in a first embodiment of the invention, further to simultaneous messages requesting authorisation to send data on the communication channel transmitted by two source nodes.
Figure 2:
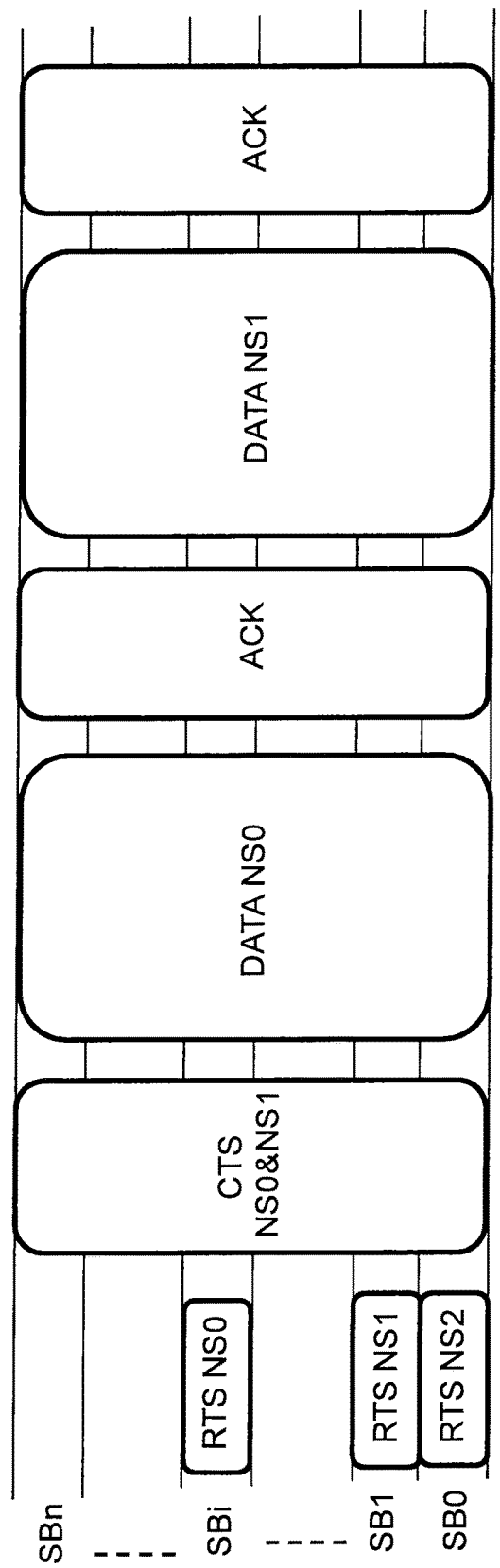
FIG. 2 is a schematic illustrating the data transiting on the different sub-bands further to simultaneous messages requesting authorisation to send data on the communication channel transmitted by three source nodes, in a second embodiment of the invention performing consecutive transmission of data from two of the source nodes.

With reference to FIGS. 1 and 2, the frequency band is divided into a set of sub-bands SB0, SB1, . . . , SBi, . . . , SBn of the communication channel, the said sub-bands being used as detailed below for transmission from a source node NS0, NS1, NS2 to a destination node of a message requesting authorisation to send data on the communication channel <<RTS NS0>>, <<RTS NS1>>, <<RTS NS2>>. More particularly the invention proposes providing frequency multiplexing for the transmission of messages requesting authorisation to send data on the communication channel, several source nodes possibly transmitting such messages simultaneously on different sub-bands.

This frequency multiplexing uses the OFDMA access method for example (<<Orthogonal Frequency Division Multiple Access>>) whereby the spectral resource (bandwidth) is divided into a set of orthogonal sub-carriers. This set of sub-carriers is itself is divided into subsets, each subset of sub-carriers forming a sub-band.

This frequency multiplexing may also use other types of multi-carrier modulation, e.g. a multi-carrier system based on a filter bank (<<Filter Bank based Multi-Carrier>>) FBMC).

In the invention each source node is provided with a backoff counter whose value is modified (typically decremented by 1) when the communication channel is detected as being available over a given duration of time (duration DIFS under the CSMA/CA protocol). The communication channel is available when no transmission is taking place on all the sub-bands SB0, SB1, . . . , SBi, . . . , SBn of the communication channel.

When the backoff counter of a source node reaches a predetermined value (typically zero) the source node transmits its data after implementing a modified RTS/CTS mechanism. The source node transmits a message requesting authorisation to send data on the communication channel (message of RTS type) over one or more sub-bands forming a sub-set of the said set of sub-bands of the communication channel (in other words the message is not transmitted over all the sub-bands). The message requesting authorisation to send data on the communication channel is transmitted by a source node over the set of sub-carriers of the sub-band(s) forming the said sub-set.

As examples, and again with reference to FIGS. 1 and 2, the source node NS0 transmits a said message <<RTS NS0>> over the sub-band SBi, the source node NS1 transmits a said message <<RTS NS1>> over the sub-band SB1 and the source node NS2 transmits a said message <<RTS NS2>> over the sub-band SB0.

In one embodiment, the sub-band(s) for transmission by a source node of the message requesting authorisation to send data on the communication channel are imposed, for example via a list of sub-bands which may become known to the source node.

In another embodiment, the source node selects the sub-band or sub-bands for transmission of the message requesting authorisation to send data on the communication channel. Selection can be made randomly for example from the set of sub-bands of the communication channel or from a sub-set thereof imposed upon the source node.

The destination node comprises a detection unit configured to detect simultaneous messages requesting authorisation to send data on the communication channel (simultaneous messages <<RTS NS0>> and <<RTS NS1>> in FIG. 1; simultaneous messages <<RTS NS0>>, <<RTS NS1>> and <<RTS NS2>> in FIG. 2), the said messages having been transmitted by a plurality of source nodes over a plurality of sub-bands. The destination node also comprises a transmission unit configured to transmit a message <<CTS NS0>>, <<CTS NS0&NS1>> on the communication channel (over all the sub-carriers of all the sub-bands) authorising the sending of data on the communication channel by at least one source node from among the plurality of source nodes. The source node(s) authorised to transmit on the communication channel can then send their data <<DATA NS0>>, <<DATA NS1>> on the communication channel i.e. over all the sub-carriers of all the sub-bands of the communication channel. Once a data transmission is completed, and if it is successful, the destination node sends an acknowledgement message ACK.

In one embodiment, the message authorising the sending of data on the communication channel by at least one source node among the said plurality of source nodes <<CTS NS0>>, <<CTS NS0&NS1>> comprises a field indicating the availability of each of the sub-bands.

According to the invention, the detection unit of the destination node is configured to listen to each of the sub-bands and to detect simultaneous messages requesting authorisation to send data transmitted by a plurality of source nodes. By simultaneous messages is meant messages transmitted by the source nodes in one same time slot when the source nodes and the destination node are synchronised, or messages transmitted by source nodes in one same time window starting on availability of the communication channel and taking into consideration the time needed to maintain availability before transmission (DIFS type) and the propagation time of the different source nodes.

With reference to FIG. 1, the destination node can therefore detect two simultaneous messages <<RTS NS0>>, <<RTS NS1>> requesting authorisation to send data on the communication channel derived from two source nodes NS0, NS1. Under a conventional CSMA/CA protocol the two messages would have been simultaneously transmitted on the communication channel and would therefore have collided, which means that neither of the two source nodes would have been able to transmit. In the invention the risk of collision is highly reduced since the messages are each transmitted over one (or more) sub-bands which may be different. And this risk is evidently all the smaller the higher the number of sub-bands. The probability of collision of simultaneous RTS messages being reduced, the overall performance of the system is improved.

On the other hand, in the event of messages transmitted simultaneously over one same sub-band, these messages collide and cannot therefore be sensed by the destination node.

In one embodiment, the destination node makes a random selection of one of more source nodes among the plurality of source nodes having transmitted a message simultaneously over one or more sub-bands requesting authorisation to send data on the communication channel.

In another embodiment the destination node makes a selection, based on a level of priority associated with each source node, of one or more source nodes from among the plurality of source nodes having simultaneously transmitted a message over one or more sub-bands requesting authorisation to send data on the communication channel (for example selecting the source node(s) of highest priority so as to ensure a certain level of quality of service for these nodes).

With reference to FIG. 1 illustrating a first embodiment of the invention, a single source node NS0 is selected (randomly or on account of its priority level) and a message <<CTS NS0>> authorising the sending of data on the communication channel by the selected source node is transmitted over the entire communication channel. After receipt of the authorisation message <<CTS NS0>> to send data, the selected source node NS0 transmits its data <<DATA NS0> on the entire communication channel then waits for an acknowledgement message <<ACK>> transmitted by the destination node also on the entire communication channel.

According to a second embodiment of the invention, the sending of data by a set of source nodes possibly comprising up to m source nodes is planned. If the number n of simultaneous messages requesting authorisation to send data on the communication channel is less than the number m, then the n source nodes are selected. On the contrary, if the number n of request messages for authorisation to send data is higher than m, the destination node selects m source nodes among n either randomly or as a function of their priority level.

The destination node transmits a message authorising the sending of data on the communication channel by a set of source nodes (the said set comprising all when n≤m, or some when n>m of the nodes of the said plurality of source nodes) including a field for each source node of said set indicating immediate or deferred transmission on the communication channel after listening to one or more acknowledgement of receipt messages transmitted by the destination node on the communication channel. With reference to FIG. 2, the source nodes NS0 and NS1 are selected and the message authorising the sending of data on the communication channel by the selected source nodes <<CTS NS0&NS1>> includes a field indicating immediate transmission by the first source node NS0 and deferred transmission by the second source node NS1 after listening to a message of acknowledgement of receipt of data ACK transmitted by the destination node. Therefore after receipt of the message authorising the sending of data <<CTS NS0&NS1>>, the source node NS0 transmits its data <<DATA NS0>> on the entire communication channel then waits for an acknowledgement of receipt message <<ACK>> transmitted by the destination node on the entire communication channel. After listening to the acknowledgement message, the source node NS1 transmits its data <<DATA NS1>> then waits for a message of acknowledgement of receipt <<ACK>>.

To examine the performance levels of the invention, the saturation throughput is calculated corresponding to an assumed throughput according to which each source node always has a packet to transmit. As indicated in the article by G. Bianchi, titled "IEEE 802.11-Saturation Throughput Analysis," IEEE Communications Letters, vol. 2, no. 12, pp. 318-320, December 1998, the throughput S corresponds to the fraction of time in which a channel is used to transmit payload data with success:

$$s = \frac{Ps \cdot Ptr \cdot L}{Ps \cdot Ptr \cdot Ts + Ptr \cdot (1 - Ps) \cdot Tc + (1 - Ptr) \cdot Tid}$$

where Ptr corresponds to the probability of having at least one transmission in the time slot under consideration, Ps corresponds to the possibility of having safe mode transmission, L is the size of an average payload packet, Ts corresponds to the mean time needed to transmit a packet of size L, Tc corresponds to the mean duration of a collision, Tid corresponds to the duration of the availability period.

This gives Ts=RTS+SIFS+σ+CTS+SIFS+σ+H+L+SIFS+σ+ACK+DIFS+σ, and Tc=RTS+DIFS+σ where H, L and ACK correspond to the transmission time lengths of the packet header, the packet payload and the acknowledgement message, and where σ corresponds to the propagation time.

The selected protocol and channel parameters are those specified for the physical layer 802.11 FH PHY, whilst the minimum size $W_{min}$ of the contention window is chosen to be constant and equal to 16.

Figure 3:
FIG. 3 illustrates the saturation throughput as a function of the number of source nodes in a conventional single-channel system.
Figure 4A:
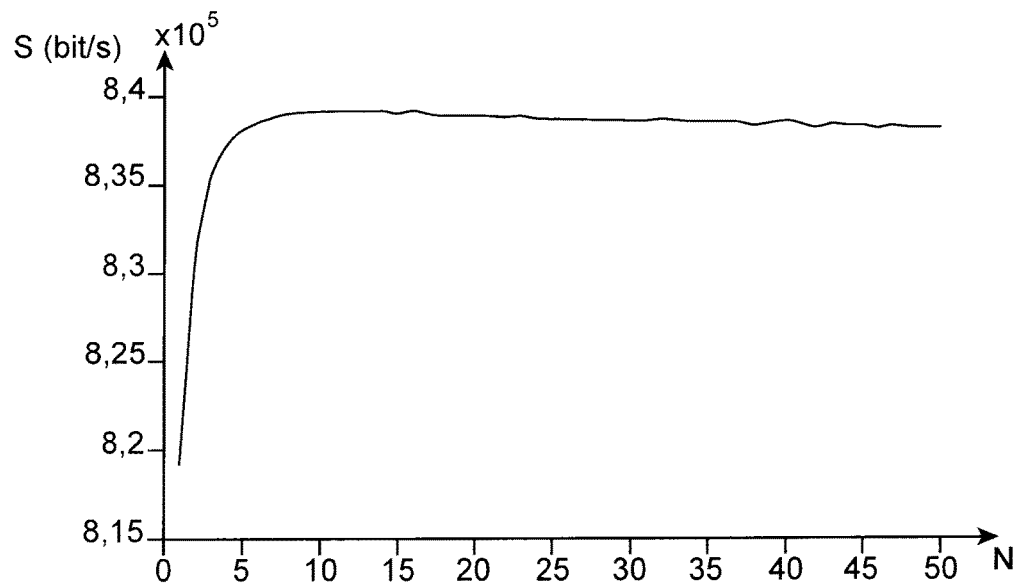
FIGS. 4a and 4b illustrate the saturation throughput as a function of the number of source nodes in a system conforming to the first embodiment of the invention comprising three and five sub-bands respectively.
Figure 4B:
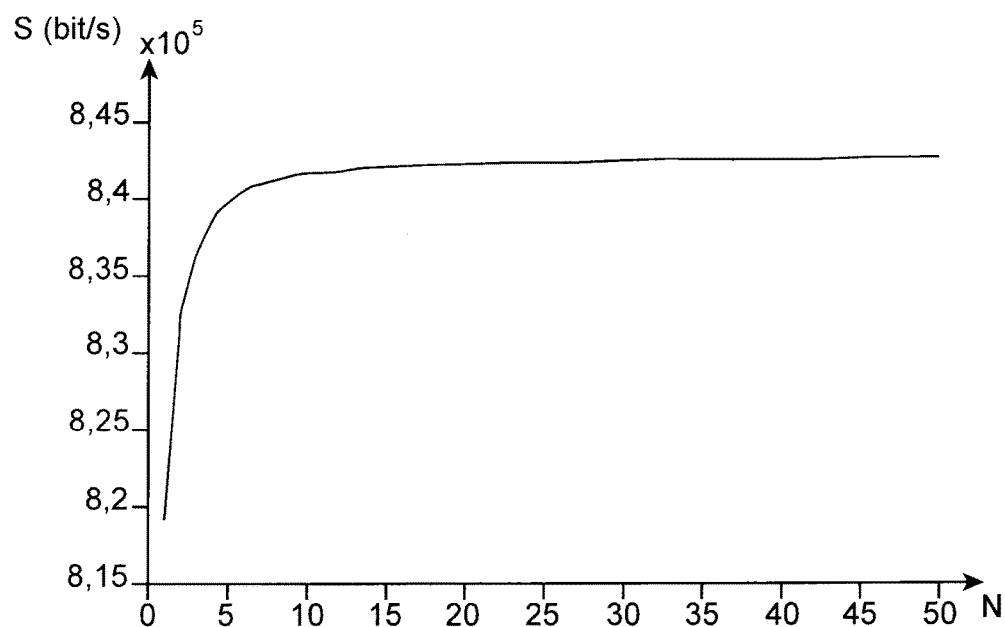

FIG. 3 illustrates the saturation throughput S as a function of number N of source nodes in a conventional CSMA/CA system. FIGS. 4a and 4b illustrate the saturation throughput S as a function of the number N of source nodes in a system conforming to the first embodiment of the invention illustrated in FIG. 1 comprising three and five sub-bands respectively.

It is found that a saturation throughput in the system conforming to the first embodiment of the invention is markedly improved in comparison with the conventional system, this improvement being all the more marked the greater the increase in the number N of source nodes. It is also found that an increase in the number of sub-bands also allows an improvement in saturation throughput.

Figure 5A:
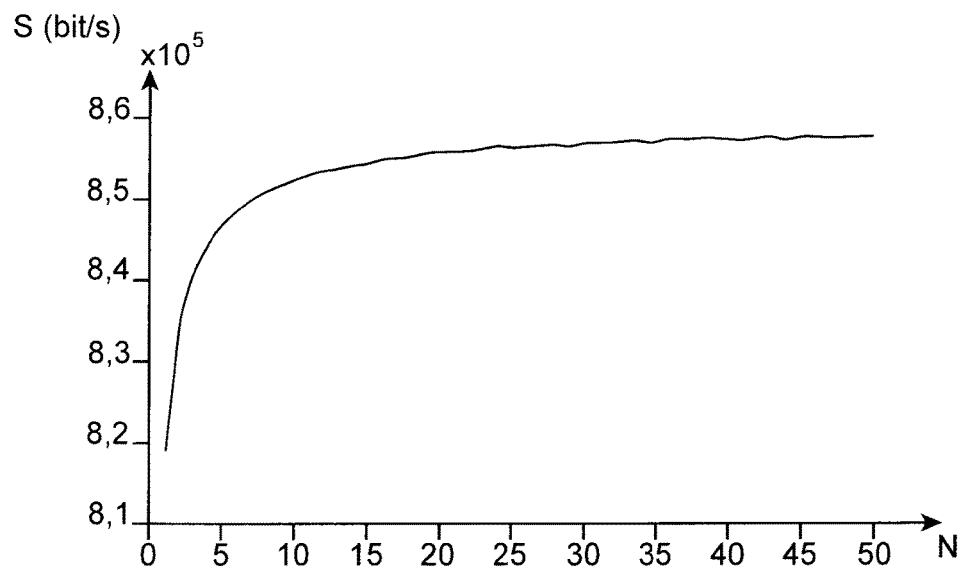
FIGS. 5a and 5b illustrate the saturation throughput as a function of the number of source nodes in a system conforming to the second embodiment of the invention comprising three and five sub-bands respectively.
Figure 5B:
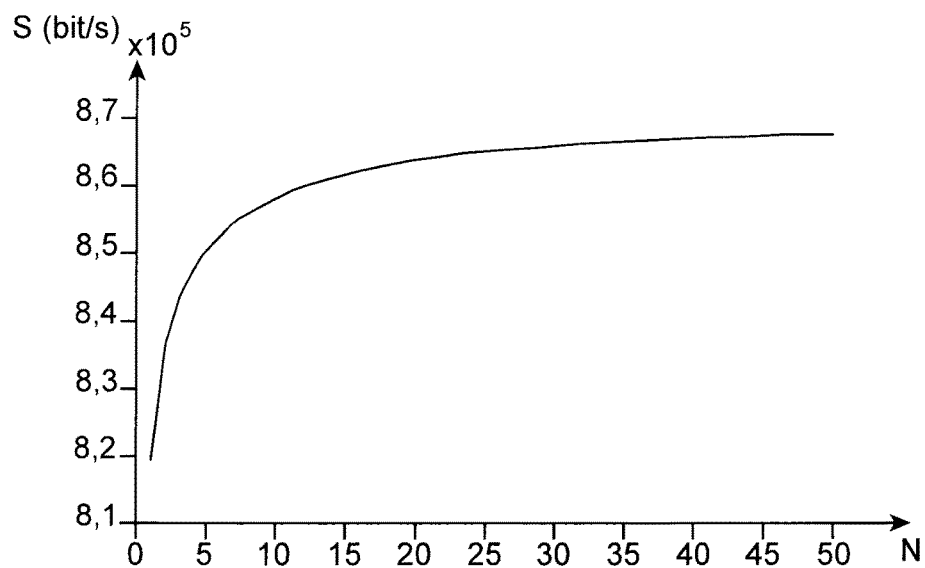

FIGS. 5a and 5b illustrate the saturation throughput S as a function of the number N of source nodes in a system conforming to the second embodiment of the invention, illustrated in FIG. 2, respectively comprising three and five sub-bands and wherein the number m of source nodes possibly having planned sending of data is 2. These Figures show that the planning of transmissions allows a further increase in saturation throughput. This is due to the reduction in overload required to transmit payload data on the communication channel (one RTS plus one CTS being sufficient to transmit two data payloads). Latency is also reduced since over one same time interval a greater number of source nodes can be served.

Therefore, depending upon to the number of users it may be advantageous to propose a system operating in conventional CSMA/CA mode, a system conforming to the first embodiment or a system conforming to the second embodiment. Dynamic modification of the operating mode can be obtained. Similarly it may be advantageous to modify the number of sub-bands in relation to the number of users, a reduced number of users not requiring a high number of sub-bands. Or further, whether or not in addition to these modifications, it may be advantageous to modify the maximum value $CW_{max}$ of the contention window of the backoff counter, typically by reduction thereof when there are few users and an increase thereof when there are numerous users. The minimum value $CW_{min}$ of the contention window may similarly be modified.

The invention is not limited to the method such as described in the foregoing, but also extends to a destination node of a communication network with multiple access to a frequency band of a communication channel with carrier sense and collision avoidance, comprising:

a detection unit configured to detect simultaneous messages requesting authorisation to send data on the communication channel received from a plurality of source nodes on a plurality of sub-bands;

a transmission unit configured to transmit on the communication channel a message authorising the sending of data on the communication channel by at least one source node from among the plurality of source nodes.

The invention also concerns a source node of a communication network with multiple access to a frequency band of a communication channel with carrier sense and collision avoidance, the said frequency band being divided into a set of sub-bands of the communication channel, the source node comprising a detection unit configured to detect the availability of the communication channel and to modify a value of a backoff counter further to detection of the availability of the communication channel, characterized in that it comprises a transmission unit configured so that when the value of the backoff counter reaches a predetermined value, it transmits a message to a destination node over one or more sub-bands forming a sub-set of said set of sub-bands of the communication channel, requesting authorisation to send data on the communication channel.

The invention also concerns a communication network with multiple access to a frequency band of a communication channel with carrier sense and collision avoidance, comprising a destination node and/or source node conforming to the invention.

The invention also extends to a computer program product comprising code instructions for performing of the detection, selection and transmission steps by the different units of the destination node, when the said program is run on a computer. And the invention further extends to a computer program product comprising code instructions, for performing of the detection, selection and transmission steps by the different units of the source node, when the said program is run on a computer.

The invention claimed is:

1. A method for multiple access to a frequency band of a communication channel of a communication network with carrier sense and collision avoidance, said frequency band being divided into a set of sub-bands of the communication channel, the method comprising at a source node:

detecting the availability of the communication channel;

subsequent to detecting the availability of the communication channel, modifying a value of a backoff counter;

when the value of the backoff counter reaches a predetermined value, transmitting to a destination node a message requesting authorization to send data on the communication channel, wherein said transmitting of the message requesting authorization to send data is performed on one or more sub-bands forming a sub-set of said set of sub-bands of the communication channel, but not performed on all of the sub-bands of said set of sub-bands; and after receiving a message authorizing the sending of data on the communication channel by the source node, transmitting the data to the destination node over all of the sub-bands of said set of sub-bands of the communication channel.

2. The method according to claim 1, comprising selecting by the source node of the sub-band(s) for transmission of the message requesting authorization to send data on the communication channel.

3. The method according to claim 1, comprising at the destination node:

detecting simultaneous messages requesting authorization to send data on the communications channel transmitted by a plurality of source nodes over a plurality of sub-bands, and transmitting a message authorizing the sending of data on the communication channel by at least one source node from among said plurality of source nodes.

4. The method according to claim 3, wherein the message authorizing the sending of data on the communication channel by said at least one source node is transmitted over all the sub-bands of the communication channel.

5. The method according to claim 3, wherein the destination node makes a random selection of said at least one source node from among the plurality of source nodes.

6. The method according to claim 3, wherein the destination node makes a selection of said at least one source node among said plurality of source nodes in accordance with a priority level associated with each of the source nodes of said plurality of source nodes.

7. The method according to claim 3, wherein the destination node transmits a message authorizing the sending of data by a set of source nodes, said set of source nodes comprising all or part of the nodes of said plurality of source nodes, said message including a field which, for each source node of said set of source nodes, indicates immediate or deferred transmission over all the sub-bands of the communication channel after listening to one or more acknowledgement of receipt messages transmitted by the destination node over all the sub-bands of the communication channel.

8. The method according to claim 7, wherein said set of source nodes comprises a maximum number of source nodes, and wherein the destination node selects a set of source nodes from among said plurality of source nodes when the number of source nodes of said plurality of source nodes is higher than the maximum number.

9. The method according to claim 3, wherein the message authorizing the sending of data on the communication channel by said at least one source node comprises a field indicating the availability of the sub-bands.

10. A method for multiple access to a frequency band of a communication channel of a communication network with carrier sense and collision avoidance, said frequency band being divided into a set of sub-bands of the communication channel, comprising at a destination node:

detecting simultaneous messages requesting authorization to send data on the communication channel transmitted by a plurality of source nodes, each message requesting authorization to send data on the communication channel being transmitted by a source node over a plurality of sub-bands forming a sub-set of said set of sub-bands of the communication channel, but not all sub-bands of the communication channel; and transmitting, over all of the sub-bands of the communication channel, a message authorizing the sending of data on the communication channel by at least one source node among said plurality of source nodes.

11. A destination node of a communication network with multiple access to a frequency band of a communication channel with carrier sense and collision avoidance, comprising:

a detector configured to detect simultaneous messages requesting authorization to send data on the communication channel from a plurality of source nodes, each message requesting authorization to send data on the communication channel being transmitted by a source node over a plurality of sub-bands forming a sub-set of said set of sub-bands of the communication channel, but not all sub-bands of the communication channel; and a transmitter configured to transmit, over all of the sub-bands of the communication channel, a message on the communication channel authorizing the sending of data on the communication channel by at least one source node among said plurality of source nodes.

12. A source node of a communication network with multiple access to a frequency band of a communication channel with carrier sense and collision avoidance, said frequency band being divided into a set of sub-bands of the communication channel, comprising a detector configured to detect the availability of the communication channel and to modify a value of a backoff counter further to detection of the availability of the communication channel; and a transmitter configured to, when the value of the backoff counter reaches a predetermined value, transmit a message to the destination node, over one or more sub-bands forming a sub-set of said set of sub-bands of the communication channel, but not over all sub-bands of said set of sub-bands, requesting authorization to send data on the communication channel, and configured to, when a message authorizing the sending of data on the communication channel by the source node is received, transmit the data to the destination node over all of the sub-bands of said set of sub-bands of the communication channel.

13. A communication network with multiple access to a frequency band of a communication channel with carrier sense and collision avoidance, comprising a destination node according to claim 11.

14. A non-transient computer program product storing code instructions for implementing the steps of the method according to claim 1 when said instructions are run on a computer.

15. A communication network with multiple access to a frequency band of a communication channel with carrier sense and collision avoidance, comprising a source node according to claim 12.

16. A non transient computer program product storing code instructions for implementing the steps of the method according to claim 10 when said instructions are run on a computer.

* * * * *